(12) United States Patent
Mitterreiter

(10) Patent No.: US 6,452,160 B1
(45) Date of Patent: *Sep. 17, 2002

(54) ANGLE MEASURING SYSTEM AND METHOD FOR MOUNTING AN ANGLE MEASURING SYSTEM

(75) Inventor: Johann Mitterreiter, Chieming (DE)

(73) Assignee: Johannes Heidenhain GmbH, Traunreut (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,047

(22) Filed: Jul. 15, 1999

(30) Foreign Application Priority Data

Jul. 17, 1998 (DE) ......................... 198 32 108

(51) Int. Cl.⁷ ................................. G01D 5/34
(52) U.S. Cl. ................. 250/231.18; 250/559.3
(58) Field of Search ...................... 250/231.18, 231.13, 250/559.3, 559.29, 548; 356/375; 341/11, 13

(56) References Cited

U.S. PATENT DOCUMENTS

| 4,942,295 A | | 7/1990 | Brunner ................. 250/231.13 |
| 5,873,630 A | * | 2/1999 | Yoshida et al. ............. 297/367 |
| 6,194,710 B1 | | 2/2001 | Mitterreiter ............ 250/231.14 |

FOREIGN PATENT DOCUMENTS

| DE | 37 40 744.9 | 6/1988 |
| EP | 0 353 395 | 2/1990 |
| EP | 0 557 564 | 9/1993 |

OTHER PUBLICATIONS

Pending Patent Application No. 09/286,404, Inventor: Mitterreiter, Filing Date: Apr. 5, 1999—to be assigned to Johannes Heidenhain GmbH.
Pending Patent Application No.—Unassigned (attorney docket No. 56/327), Inventor: Michel et al., Filing Date: Jul. 30, 1999—to be assigned to Johannes Heidenhain GmbH.

* cited by examiner

Primary Examiner—Que T. Le
(74) Attorney, Agent, or Firm—Brinks Hofer Gilson & Lione

(57) ABSTRACT

An angle measuring system for measuring the angular position of two objects which are rotatable around an axis in relation to each other and includes a support with a graduation, wherein the support can be connected on a first object. A scanning device which can be fastened on a second object. A clamping element which fixes at least the axial positional relationship between the graduation and the scanning device before and during their mounting on the first and second objects, wherein the clamping element and/or the support are deformed by being radially pressed together in a clamping area, and this deformation causes at least an axially acting interlocking connection between the scanning device and the support.

36 Claims, 5 Drawing Sheets

ANGLE MEASURING SYSTEM AND METHOD FOR MOUNTING AN ANGLE MEASURING SYSTEM

Applicant claims, under 35 U.S.C. §119, the benefit of priority of the filing date of Jul. 17, 1998 of a German patent application, copy attached, Ser. No. 198 32 108.2, filed on the aforementioned date, the entire contents of which is incorporated herein by reference.

BACKGROUND OF THE INVENTION

1. Field of the Invention

The present invention relates to an angle measuring system for measuring the angular position of two objects which are rotatable around an axis in relation to each other. It further relates to a method for mounting the angle measuring system.

2. Discussion of Related Art

Such an angle measuring system and such a method are known from U.S. Pat. No. 4,942,295. The described angle measuring systems do not have their own bearings. To make attachment to the objects to be measured easier, the position correlation of the graduation support and the scanning device, which is necessary for operation, has already been fixed by the manufacturer of the angle measuring system by pre-mounting. To this end, an annular groove has been cut in the hub to which the graduation support is attached. Two fixation elements in the form of projections have been formed on the scanning device, which can be radially displaced by means of pressure elements and in the pre-mounted state engage the groove in the hub and in this way fix the axial position correlation between the scanning device and the graduation support.

The disadvantage of this angle measuring system lies in that the position of the groove must be exactly matched to the position and tolerances of the projections already in the course of the manufacturing process. Thus, very narrow tolerances have to be maintained during the manufacturing process, which makes production more expensive. It is moreover known that in connection with graduation supports having an incremental graduation, the required scanning distance is a function of the graduation period. Therefore the position of the groove must be individually exactly manufactured as a function of the graduation period. This requires the manufacture, as well as the storage of different hubs.

SUMMARY OF THE INVENTION

The invention is based on the object of providing an angle measuring system, wherein the required correlation between the graduation support and the scanning device can be preset in a simple manner and which can be simply produced.

This object is attained by the angle measuring system for measuring the angular position of two objects which are rotatable around an axis in relation to each other and includes a support with a graduation, wherein the support can be connected on a first object. A scanning device which can be fastened on a second object. A clamping element which fixes at least the axial positional relationship between the graduation and the scanning device before and during their mounting on the first and second objects, wherein the clamping element and/or the support are deformed by being radially pressed together in a clamping area, and this deformation causes at least an axially acting interlocking connection between the scanning device and the support.

The particular advantages of the angle measuring system of the present invention rest in that the required correlation between the graduation support and the scanning device can be simply fixed in at least the axial direction without it being necessary, when producing the scanning device and the hub, to take this correlation into consideration.

A second object of the invention to provide a method for pre-mounting an angle measuring system, which makes a simple correlation between the graduation support and the scanning device possible.

The second object is attained by the a method for mounting an angle measuring system that includes setting a scanning distance (a) between a graduation and a scanning device of an angle measuring system and creating an interlocking connection between the scanning device and a support supporting the graduation, which fixes the scanning distance (a), by the deformation of at least one area of the support and/or of the scanning device. The method further includes installing the support on a first object to be measured, installing the scanning device on a second object to be measured, and releasing the interlocking connection.

The particular advantage of this method rests in that the position correlation is determined only at the time of pre-mounting and that this position correlation can nevertheless be fixed in a highly exact and stable manner.

Further objects, advantages and details of the invention will become apparent from the ensuing description of an exemplary embodiment in conjunction with the accompanying drawings.

DESCRIPTION OF THE PREFERRED EMBODIMENT

Figure 1:
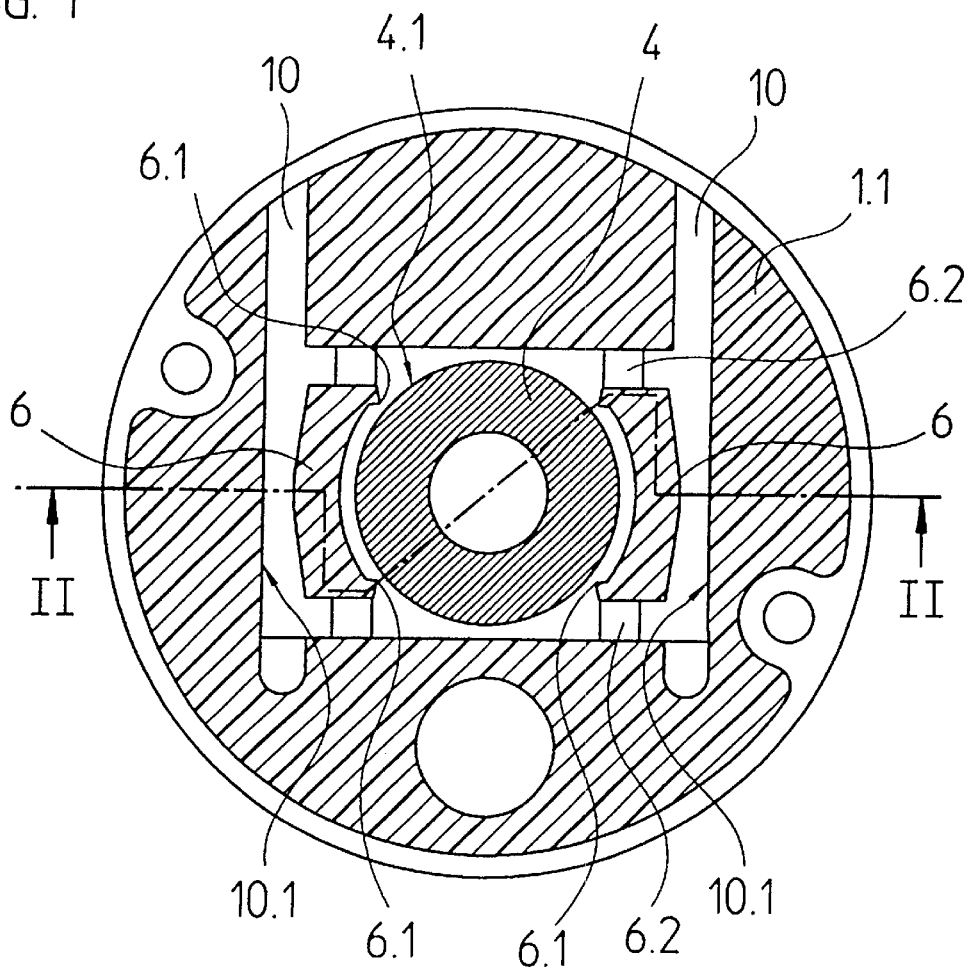
FIG. 1 is a cross section through an embodiment of an angle measuring system according to the present invention.

A first exemplary embodiment of the invention is represented in FIGS. 1 to 5. In a manner known per se, the angle measuring device includes a scanning device 1, stationary as a rule, and a graduation support in the shape of a graduation plate or disk 2 with a graduation 3.

The scanning device 1 includes a support 1.1 and a plate 1.2 with a scanning plate 1.3, as well as a light source, not represented, and with photodetectors. The graduation is scanned by means of the transmitted light or incident light method. The electrical scanning signals generated in the course of scanning are transmitted via a line, not represented, to an electronic follow-up device, for example a counter or a numerical control. The photodetectors are arranged in the beam path downstream of the scanning plate 1.3. It is also possible for the scanning plate 1.3 and the photodetectors to form a common scanning element in that the scanning structure is directly applied to the surface of the photodetectors as a screen, or that the photodetectors are made textured.

The graduation disk 2 is fastened on a hub 4, wherein the hub 4 has means for being coupled, fixed against relative rotation, with a shaft 8 to be measured. A screw is provided for this in the example. However, another connection which is coupled with a shaft 8 so as to be fixed against relative rotation can also be used, for which purpose the hub 4 can also be designed with a slit in the form of a collet chuck, for example.

In order to be able to realize a radial and axial position correlation (scanning distance a between the scanning plate 1.3 and the partial graduation plate 2) between the graduation disk 2 and the scanning device 1, an annular capped gripping point 4.1 is attached to the exterior circumference of the hub 4 at the place of the manufacturer of the angle measuring system. Two radially oppositely located clamping jaws 6 are arranged in, or respectively on the scanning device 1. These clamping jaws 6 are formed on a transition area 6.2 of the scanning device 1 and can be displaced radially in the direction of the hub 4 in a clamping area 6.3, which is at a distance, in particular an axial distance therefrom, by means of a pressure element 7. In the course of this displacement, the transition area 6.2 between the support 1.1 of the scanning device 1 and the clamping jaw 6 is used as a joint. The clamping jaws 6 are resilient transversely, i.e. radially, in relation to the axis A, and rigid in the direction of the axis A.

The pressure element is a U-shaped hoop 7, which is pushed radially into openings 10, are located symmetrically opposite each other, of the support 1.1 of the scanning device 1. In the course of being pushed in, the exterior surfaces of the two legs of the hoop 7 are supported on radially inward pointing contact faces 10.1 of the support 1.1, and in this way push the two clamping jaws 6 symmetrically evenly inward.

Figure 2:
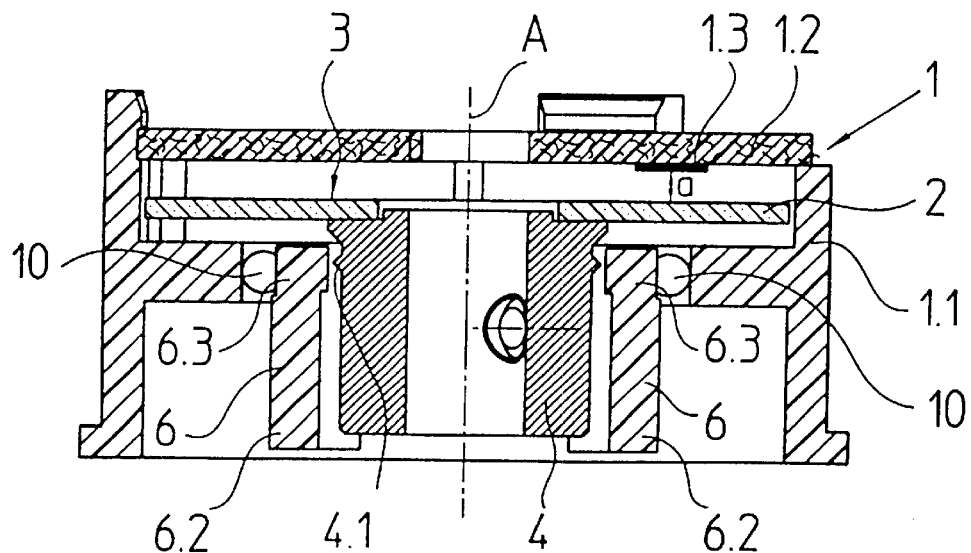
FIG. 2 is an axial longitudinal section of the angle measuring system in FIG. 1 along the line II—II of FIG. 1.

For pre-mounting, the axial distance a between the graduation disk 2 and the scanning plate 1.3 is exactly set by means of measurements or of a gauge. This pre-mounted state of the angle measuring system is represented in FIGS. 1 and 2.

Figure 3:
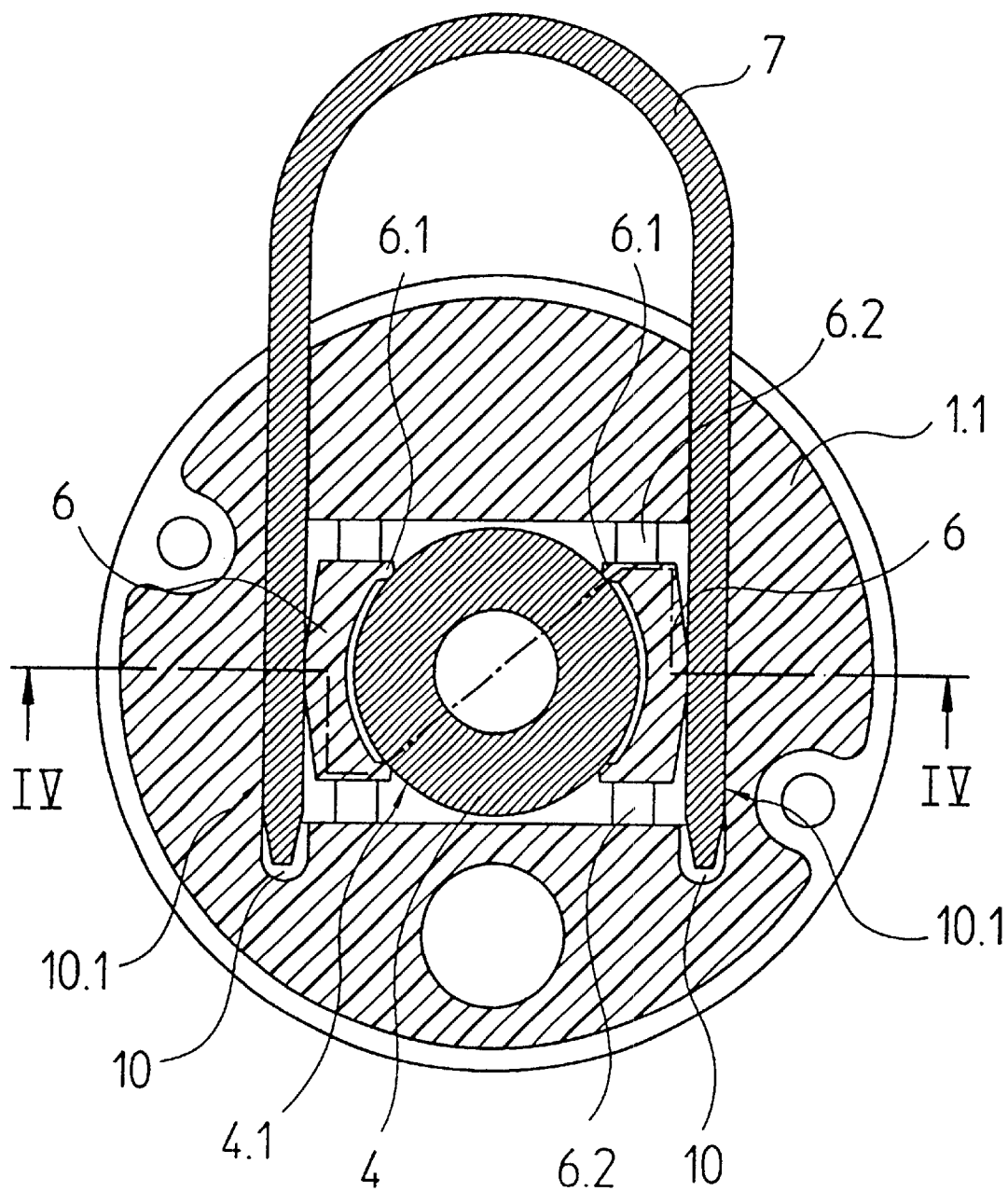
FIG. 3 shows the angle measuring system of FIG. 1 in the pre-mounted state in cross section.
Figure 4:
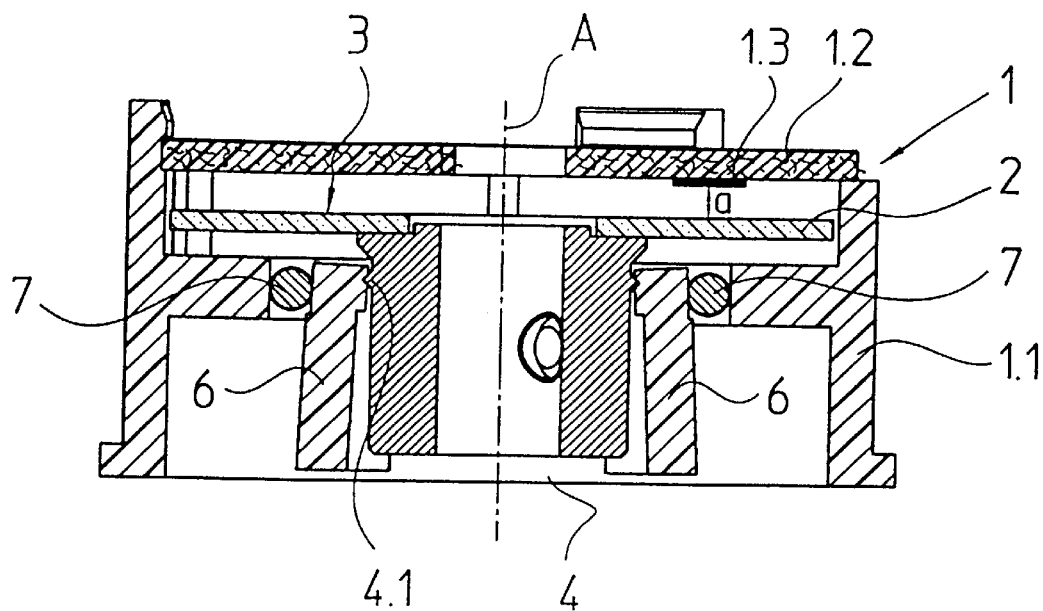
FIG. 4 is an axial longitudinal section of the angle measuring system in FIG. 3.
Figure 5:
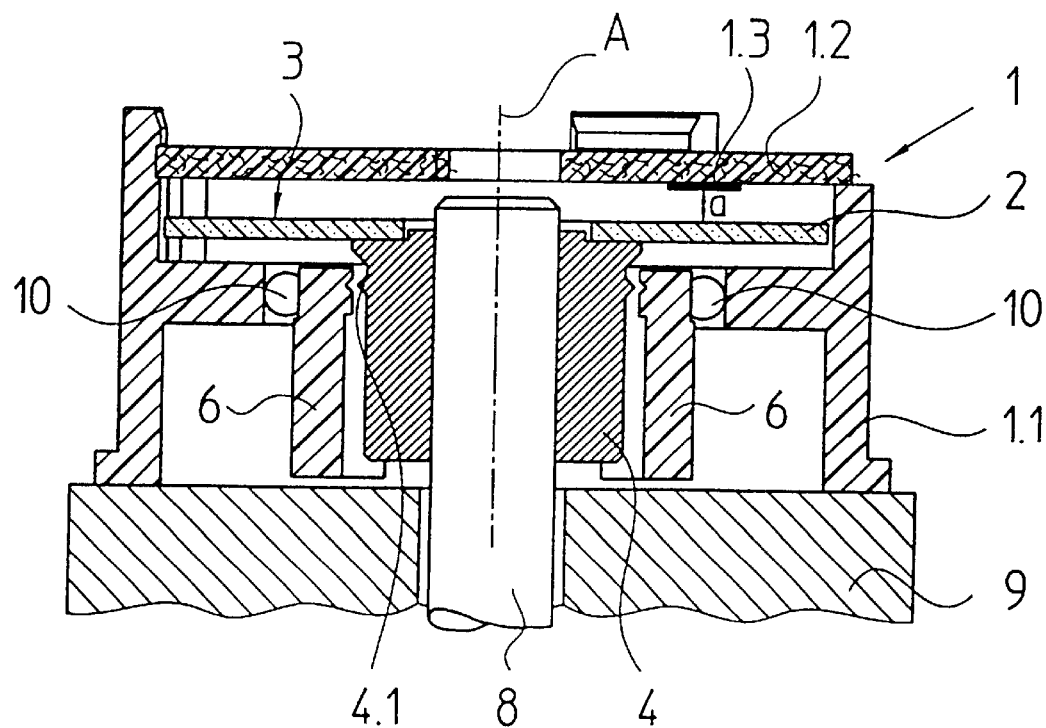
FIG. 5 shows the angle measuring system of FIG. 1 in the finished mounted operational state.

In this state, radial clamping takes place between the hub 4 and the scanning device 1 in that the pressure element 7 urges the clamping jaws 6 against the hub 4. The annular capped gripping point 4.1 is provided for the stable fixation of this set position correlation, and it is pressed into the clamping jaws 6 and forms an axially acting interlocked connection. Since usually the hub 4 is a rotating element made of metal, and the clamping jaws 6 formed on the support 1.1 of the scanning device 1 are made of plastic, this interlocking connection can be realized in a simple manner. Several protrusions in the shape of axially extending strips 6.1 have been formed on each one of the clamping jaws 6 in order to obtain this interlocked connection in a definite way at the positions which are distributed, offset in respect to each other, over the circumference of the capped gripping point 4.1. In the course of the radial insertion of the hoop-shaped pressure element 7, the capped gripping point 4.1 is pressed into the clamping jaws 6 only in the area of the protrusions 6.1, so that only in this area material of the clamping jaws 6 is displaced by the capped gripping point 4.1. This pre-mounted state of the angle measuring system is represented in FIGS. 3 and 4.

In this state, the angle measuring system is delivered, transported and installed on the objects 8 and 9 to be measured. In the course of this, the set distance a between the graduation disk and the scanning device 1 is dependably maintained. As a rule, the objects to be measured are a shaft 8, whose rotational position in relation to a stationary element 9 is to be measured. Here, the stationary element 9 can be a motor housing or a motor flange.

Following installation on the objects 8, 9 to be measured, it is necessary to release the clamped connection between the hub 4 and the scanning device 1. To this end, the pressure element 7 is displaced in such a way that the clamping jaws 6 are removed from the hub 4. Since the clamping jaws 6 are formed on the support 1.1 of the scanning device 1 and are made of plastic, following removal of the pressure element 7 they automatically move back into the stable rest position by springing back. In this case, the transition area 6.2 at the transition between the support 1.1 and the clamping jaw 6 acts as a resilient spring joint. The angle measuring device is shown in the installed state in FIG. 5.

For improved understanding of the invention, elements acting in substantially the same way are provided with the same reference numerals in all exemplary embodiments.

Figure 6:
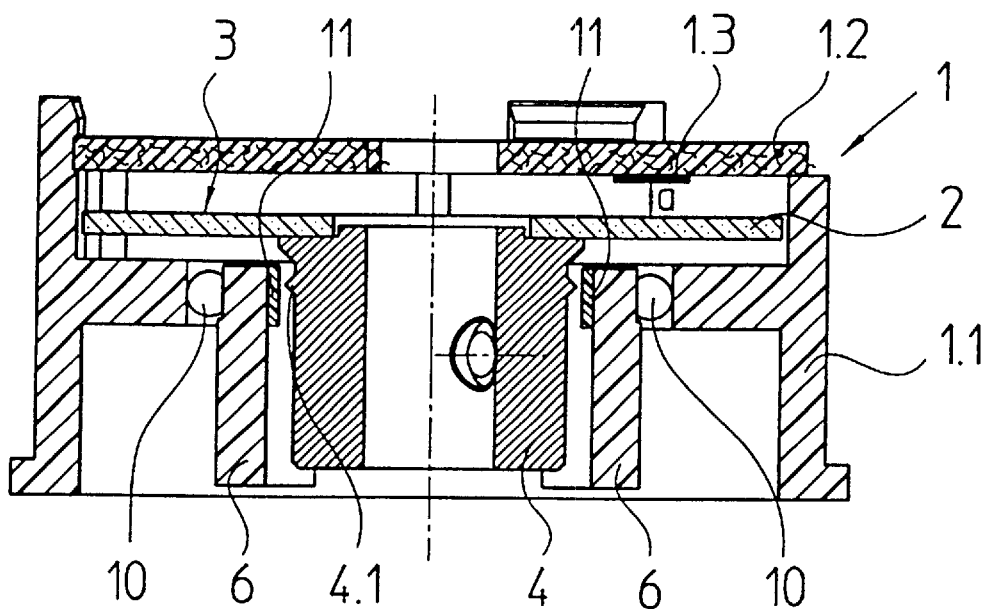
FIG. 6 shows a second embodiment of an angle measuring system according to the present invention in longitudinal section.

The invention can also be realized when the clamping jaws 6 do not include a material which is easily deformed by material displacement. One of these variants is represented in FIG. 6. The clamping jaws 6 are coated in the deflectable clamping area 6.3 with a material 11, which can be easily displaced by material deformation and/or material compression, so that the capped gripping point 4.1 can be pressed into this material and makes an interlocking connection.

Figure 7:
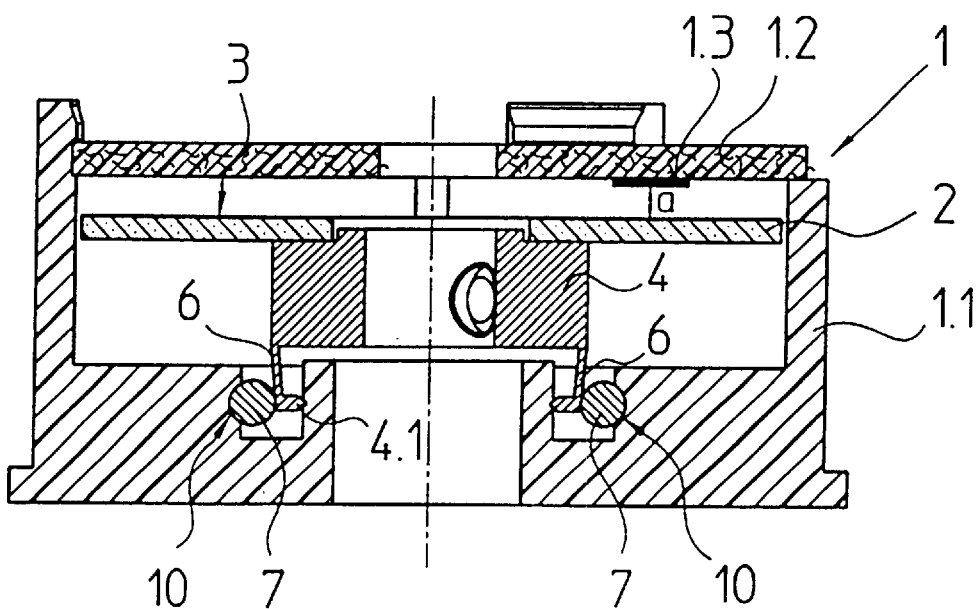
FIG. 7 shows a third embodiment of an angle measuring system according to the present invention in longitudinal section.

A further variant of the invention is represented in FIG. 7. In this case the clamping jaws 6 are provided on the hub 4, in particular are formed thereon. The clamping jaw 6 are resilient areas of the hub 4, which can be radially displaced by means of a pressure element 7, and they have a raised portion in the form of a capped gripping point 4.1, which is pressed into the support 1.1 of the scanning device 1. The axial correlation of the pressure element 7 in relation to the scanning device 1 is provided by openings 10, and the axial correlation between the scanning plate 1.3 of the scanning device 1 and the hub 4 is fixed by the penetration of the capped gripping point 4.1 into a part of the scanning device 1. After the hub 4 and the scanning device have been mounted on objects to be measured, the pressure element 4 is taken out of contact and the clamping jaws 6 spring resiliently back into their position of rest, in which they no longer are in contact with elements of the scanning device 1. Preferably the clamping jaws 6 are segments of an axially slit and/or thinned area of the hub 4.

Figure 8:
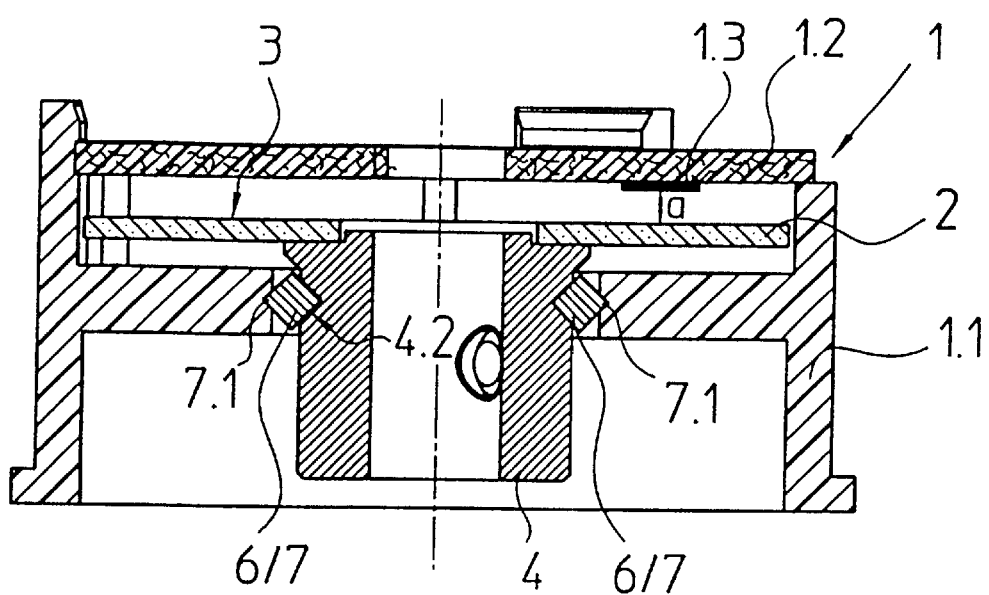
FIG. 8 shows a fourth embodiment of an angle measuring system according to the present invention in longitudinal section.

An example wherein the pressure element 7 also has the function of the clamping jaws 6 is represented in FIG. 8. Because of this dual function, the pressure element is identified by the reference numeral 6/7. For this purpose recesses 4.2 have been cut into the hub 4, which are used to guide the pressure element 6/7. The pressure element 6/7 has bezels 7.1, which are pressed into the support 1.1 of the scanning device 1 in the course of the radial insertion of the pressure element 6/7 and fix the axial positional relationship between the hub 4 and the scanning device 1. This fixation should take place on at least three locations distributed over the circumference of the hub 4. For easier insertion, the pressure element 6/7 can be conically shaped in such a way that it is increasingly pressed into the support 1.1 during the insertion, i.e. that the radial width of the pressure element 6/7 increases.

In place of a capped gripping point it is also possible to provide a ribbing to achieve an interlocking connection, wherein the capped gripping point, or respectively the ribbing can be arranged on the hub or the scanning device. The required interlocking connection can be achieved by the deformation of the scanning device and/or the hub, depending on which element the protrusions have been formed and of which material the elements are made. These alternative embodiments apply to all described exemplary embodiments.

The invention is not limited to the described photoelectric angle measuring system, but can also be realized with inductive, magnetic and capacitive angle measuring systems. The graduation can be designed incremental or absolute.

In place of the hoop-shaped pressure element 7 it is also possible to provide another pressure-exerting element, or several elements can be provided. In this case the pressure element can be axially or radially displaceable in, or respectively on the scanning device. Thus, the pressure element can also be provided on the cover (housing), so that the pressure element can cause, and also release the interlocking connection by means of a rotation or axial displacement of the cover in relation to the scanning device. Reference is made to EP 0353 395 B1 in regard to the possible embodiment and relative arrangement of the pressure elements.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An angle measuring system for measuring the angular position of two objects which are rotatable around an axis in relation to each other, the angle measuring system comprising:
   a support comprising a graduation, wherein the support being connected on a first object:
   a scanning device being fastened on a second object;
   a clamping element which fixes at least the axial positional relationship between the graduation and the scanning device before and during their mounting on the first and second objects, wherein the clamping element or the support is deformed by being radially pressed together in a clamping area, and this deformation causes at least an axially acting interlocking connection between the scanning device and the support.

2. The angle measuring system in accordance with claim 1, wherein the support comprises a hub, and wherein the clamping element is urged against the hub by a pressure element.

3. The angle measuring system in accordance with claim 2, wherein the pressure element comprises a U-shaped hoop whose legs are supported at radially inward pointing contact faces of the scanning device.

4. The angle measuring system in accordance with claim 2, wherein the hub comprises a projection which has been pressed into an area of the scanning device.

5. The angle measuring system in accordance with claim 3, wherein the hub comprises a projection which has been pressed into an area of the scanning device.

6. The angle measuring system in accordance with claim 4, wherein the projection is a capped gripping point which is pressed into several places distributed over the circumference of the scanning device.

7. The angle measuring system in accordance with claim 5, wherein the projection is a capped gripping point which is pressed into several places distributed over the circumference of the scanning device.

8. The angle measuring system in accordance with claim 2, wherein the clamping element is formed on the scanning device and can be radially displaced on the clamping area. by the pressure element.

9. The angle measuring system in accordance with claim 3, wherein the clamping element is formed on the scanning device and can be radially displaced on the clamping area. by the pressure element.

10. The angle measuring system in accordance with claim 4, wherein the clamping element is formed on the scanning device and can be radially displaced on the clamping area. by the pressure element.

11. The angle measuring system in accordance with claim 5, wherein the clamping element is formed on the scanning device and can be radially displaced on the clamping area. by the pressure element.

12. The angle measuring system in accordance with claim 6, wherein the clamping element is formed on the scanning device and can be radially displaced on the clamping area. by the pressure element.

13. The angle measuring system in accordance with claim 7, wherein the clamping element is formed on the scanning device and can be radially displaced on the clamping area. by the pressure element.

14. The angle measuring system in accordance with claim 4, wherein the clamping element comprises a plastic and the hub comprises a metal, wherein the projection of the hub comprises displaced material of the clamping element.

15. A method for mounting an angle measuring system, comprising:
   setting a scanning distance (a) between a graduation and a scanning device of an angle measuring system;
   creating an interlocking connection between the scanning device and a support supporting the graduation, which fixes the scanning distance (a), by the deformation of at least one area of the support or of the scanning device;
   installing the support on a first object to be measured;
   installing the scanning device on a second object to be measured; and
   releasing the interlocking connection.

16. The method in accordance with claim 15, wherein the interlocking connection is created in that a clamping element is radially displaced in a direction toward the support, and a projecting area of the support is pressed into the clamping element and displaces the clamping element.

17. The method in accordance with claim 15, wherein the interlocking connection is created in that at least one area of the clamping element, which is formed or fastened on the scanning device, is displaced out of a resting position by a pressure element, and the interlocking connection is released in that the pressure element is removed from the clamping element and the clamping element springs back resiliently into the resting position.

18. The method in accordance with claim 16, wherein the interlocking as connection is created in that at least one area of the clamping element, which is formed or fastened on the scanning device, is displaced out of a resting position by a pressure element, and the interlocking connection is released in that the pressure element is removed from the clamping element and the clamping element springs back resiliently into the resting position.

19. An angle measuring system for measuring the angular position of two object which are rotatable around an axis in relation to each other, the angle measuring system comprising:
   a support comprising a graduation, wherein the support being connected on a first object:
   a scanning device being fastened on a second object;
   a clamping element which fixes at least the axial positional relationship between the graduation and the scanning device before and during their mounting on the first and second objects, wherein the clamping element and the support are deformed by being radially pressed together in a clamping area, and this deformation causes at least an axially acting interlocking connection between the scanning device and the support.

20. The angle measuring system in accordance with claim 19, wherein the support comprises a hub, and wherein the clamping element is urged against the hub by a pressure element.

21. The angle measuring system in accordance with claim 20, wherein the pressure element comprises a U-shaped hoop whose legs are supported at radially inward pointing contact faces of the scanning device.

22. The angle measuring system in accordance with claim 20, wherein the hub comprises a projection which has been pressed into an area of the scanning device.

23. The angle measuring system in accordance with claim 21, wherein the hub comprises a projection which has been pressed into an area of the scanning device.

24. The angle measuring system in accordance with claim 22, wherein the projection is a capped gripping point which is pressed into several places distributed over the circumference of the scanning device.

25. The angle measuring system in accordance with claim 23, wherein the projection is a capped gripping point which is pressed into several places distributed over the circumference of the scanning device.

26. The angle measuring system in accordance with claim 20, wherein the clamping element is formed on the scanning device and can be radially displaced on the clamping area. by the pressure element.

27. The angle measuring system in accordance with claim 21, wherein the clamping element is formed on the scanning device and can be radially displaced on the clamping area. by the pressure element.

28. The angle measuring system in accordance with claim 22, wherein the clamping element is formed on the scanning device and can be radially displaced on the clamping area. by the pressure element.

29. The angle measuring system in accordance with claim 23, wherein the clamping element is formed on the scanning device and can be radially displaced on the clamping area by the pressure element.

30. The angle measuring system in accordance with claim 24, wherein the clamping element is formed on the scanning device and can be radially displaced on the clamping area. by the pressure element.

31. The angle measuring system in accordance with claim 25, wherein the clamping element is formed on the scanning device and can be radially displaced on the clamping area. by the pressure element.

32. The angle measuring system in accordance with claim 22, wherein the clamping element comprises a plastic and the hub comprises a metal, wherein the projection of the hub comprises displaced material of the clamping element.

33. A method for mounting an angle measuring system, comprising:
   setting a scanning distance (a) between a graduation and a scanning device of an angle measuring system;
   creating an interlocking connection between the scanning device and a support supporting the graduation, which fixes the scanning distance (a), by the deformation of at least one area of the support and of the scanning device;
   installing the support on a first object to be measured;
   installing the scanning device on a second object to be measured; and
   releasing the interlocking connection.

34. The method in accordance with claim 33, wherein the interlocking connection is created in that a clamping element is radially displaced in a direction toward the support, and a projecting area of the support is pressed into the clamping element and displaces the clamping element.

35. The method in accordance with claim 33, wherein the interlocking connection is created in that at least one area of the clamping element, which is formed or fastened on the scanning device, is displaced out of a resting position by a pressure element, and the interlocking connection is released in that the pressure element is removed from the clamping element and the clamping element springs back resiliently into the resting position.

36. The method in accordance with claim 34, wherein the interlocking connection is created in that at least one area of the clamping element, which is formed or fastened on the scanning device, is displaced out of a resting position by a pressure element, and the interlocking connection is released in that the pressure element is removed from the clamping element and the clamping element springs back resiliently into the resting position.

* * * * *

UNITED STATES PATENT AND TRADEMARK OFFICE
CERTIFICATE OF CORRECTION

PATENT NO. : 6,452,160 B1
DATED : September 17, 2002
INVENTOR(S) : Johann Mitterreiter It is certified that error appears in the above-identified patent and that said Letters Patent is hereby corrected as shown below:

Column 6,
Lines 11, 15, 19, 23, 27 and 31, immediately after "area" delete "." (period).
Line 64, delete "as" before "connection".

Column 7,
Line 5, delete "object" and substitute -- objects -- in its place.
Lines 43 and 47, immediately after "area" delete "." (period).

Column 8,
Lines 7 and 11, immediately after "area" delete "." (period).

Signed and Sealed this

Twenty-sixth Day of August, 2003

JAMES E. ROGAN
*Director of the United States Patent and Trademark Office*